No. 614,594. Patented Nov. 22, 1898.
J. E. WILLIAMSON.
APPARATUS FOR PURIFYING LIQUIDS.
(Application filed Feb. 12, 1898.)
(No Model.) 2 Sheets—Sheet 1.
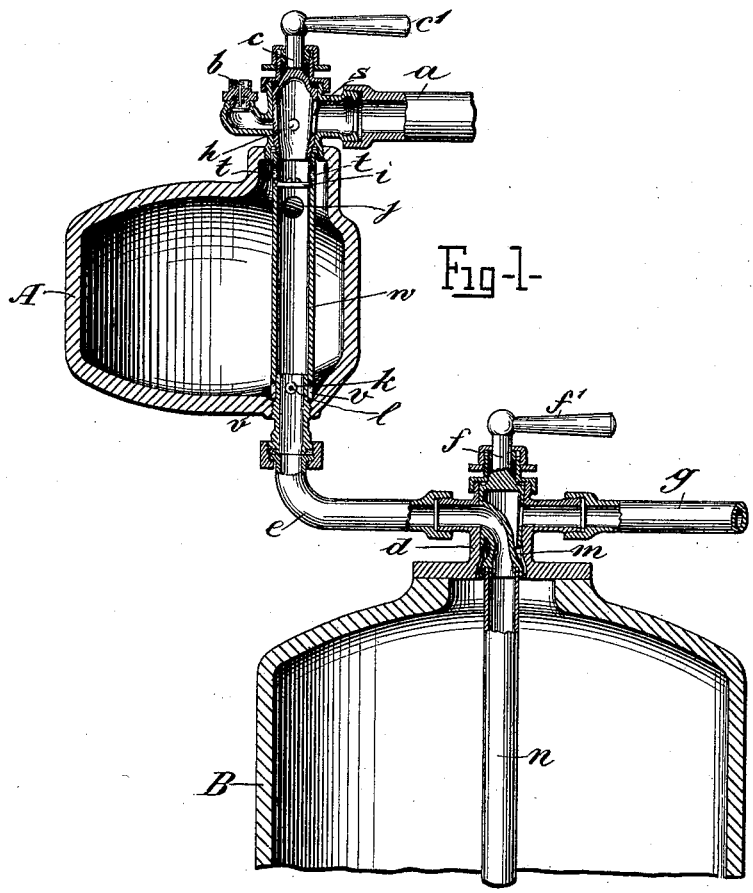
Fig-1-
WITNESSES:
F. N. Roehrich
James C. Reilly
INVENTOR
James E. Williamson
BY
J. R. Hindon Hyde
ATTORNEY

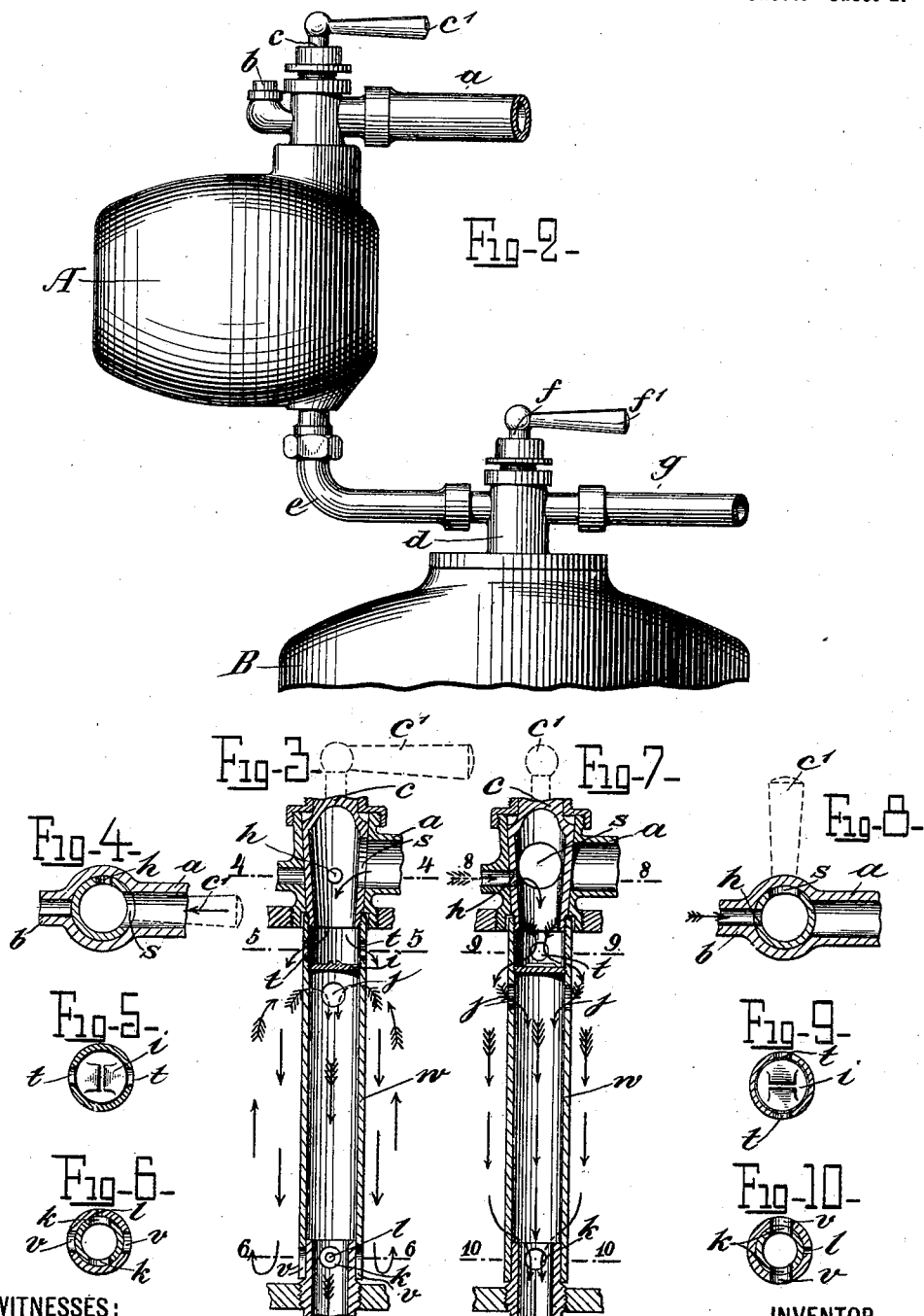

UNITED STATES PATENT OFFICE.

JAMES E. WILLIAMSON, OF NEW YORK, N. Y., ASSIGNOR TO HENRY B. ANDERSON, OF SAME PLACE.

APPARATUS FOR PURIFYING LIQUIDS.

SPECIFICATION forming part of Letters Patent No. 614,594, dated November 22, 1898.

Application filed February 12, 1898. Serial No. 670,067. (No model.)

*To all whom it may concern:*

Be it known that I, JAMES E. WILLIAMSON, a citizen of the United States, residing in the city, county, and State of New York, have invented certain new and useful Improvements in the Art of Purifying Liquids and Apparatus for the Same, of which the following is a specification.

The invention relates to the art of purifying water and liquids of which water is the principal constituent; and it consists in a new and improved method and apparatus by which the filtering material is aerified during the process of washing it.

The object of my invention is to force air under pressure through the filtering material during the process of washing it and to utilize the pressure of the washing-stream to effect this result.

My invention is illustrated in the accompanying drawings, in which—

Figure 1 represents a view, partly in section and partly in perspective, of my apparatus when connected with a filter during the process of washing. Fig. 2 shows a perspective view of my apparatus in connection with the top of the filter. Fig 3 is a sectional view of the stand-pipe contained in the air-chamber with the inlet-valve in position for the process of washing. Fig. 4 is a section on the line 4 4 of Fig. 3. Fig. 5 is a part section and a part plan view on the line 5 5 of Fig. 3. Fig. 6 is a section on the line 6 6 of Fig. 3. Fig. 7 is a sectional view of the stand-pipe contained in the air-chamber when the valve-handle is turned so as to cut off the supply of water to the filter and to admit air to the air-chamber. Fig. 8 is a sectional view on the line 8 8 of Fig. 7. Fig. 9 is a view, partly in section and partly in plan, on the line 9 9 of Fig. 7. Fig. 10 is a sectional view on the line 10 10 of Fig. 7.

The feathered arrows in the drawings show the currents of air in the apparatus, and the unfeathered arrows show the currents of water in the apparatus.

Similar letters of reference refer to similar parts throughout the several views of the drawings.

Referring to the figures, A is the air-chamber, which is connected by the pipe $e$ to the filter B.

$c$ is a valve seated in the top of the air-chamber A and having a handle $c'$, which is shown in Figs. 1, 2, and 3 as properly turned for the operation of washing.

$b$ is an opening to the air, containing a check-valve.

$a$ is a pipe for the admission of the water used in washing. $s$ is the inlet-port for said pipe.

$h$ is a port in one side of the valve $c$, the object of which will be hereinafter explained.

$t\,t$ are ports in the side of the pipe $n$.

$i$ is a partition screwed into the pipe $n$ and seated below the ports $t\,t$.

$k\,k$ are ports on opposite sides of the connecting-pipe $v$, which is sleeved within the rotatable pipe $w$.

$l$ is a smaller port situated in the pipe $w$, coinciding with one of the ports $k$ when the latter are in the position shown in Figs. 1, 2, and 3.

$f$ is a valve seated in the top of the filtering-chamber B, the valve-seat being represented by $d$.

$f'$ is the valve-handle of the valve $f$.

$g$ is the outlet for the filtered and the wash water.

$m$ is the outlet for the water from the filtering-chamber B, through which the water passes into the valve $f$ and out through the pipe $g$.

$o$ is a perforated screen situated in the bottom of the filter-case B.

$p$ is the port through which the water passing through the pipe $n$ escapes out into the filtering-chamber.

For purposes of simplicity I have omitted representing the filtering material, which may be of any suitable kind and which is contained in the filter-chamber B above the perforated screen $o$.

The operation of the apparatus is as follows when used for washing: The valves $c$, $b$, and $f$ being in the positions shown in Figs. 1, 2, 3, 4, 5, and 6, the water used for washing the filtering material enters through the pipe $a$ under pressure, through the port $s$, the ports $t\,t$, out and around the pipe $w$ into the interior of the air-chamber A, its egress at this time from the chamber A throught he pipe $w$ being cut off by reason of the partition $i$, the port $k$ being closed against the wall of the pipe. As the water enters the air-chamber A it will gradually rise in said chamber, forcing the air before it, and the air having no other means of escape enters the port $j$ in the pipe $w$, passing through the latter down into and through the filtering-chamber to the bottom of the latter, whence it escapes through the port $p$ and through the screen $o$, up and through the filtering material contained in the filtering-chamber B, and thence out through the valve $m$ and the pipe $g$, thus thoroughly aerifying the filtering material. The air will be followed, of course, by the water under pressure. In some cases there may be an excessive head of water, producing a strain upon the apparatus, and to provide against this contingency I have placed a very small port $l$ in the pipe $n$ near its bottom in the air-chamber A, so that water can escape through this port $l$ during the operation of washing, down through the pipe $e$, and its continuation $n$ in the filter-chamber. When the water has completely filled the air-chamber A, it will overflow through the port $j$ in the pipe $w$, down through the pipe $e$ and the continued pipe $n$, out through the port $p$ in the bottom of the filtering-chamber B, and up through the filtering material contained in this chamber, and out through the valve $m$ and the pipe $g$, carrying the air with it or in advance of it, and thus there is a simultaneous washing and aerification of the filtering material. When the operator observes that the air-chamber A has been emptied of air by the incoming water and that the wash-water therefore is not aerified, he turns the handle of the valve $c$ into the position shown at $c'$, Figs. 7 and 8, with a corresponding turning of the different ports, as shown in Figs. 7, 8, 9, and 10. In turning the valve $c$ he has given a quarter-turn to the port $h$ and has simultaneously closed the port $s$, which heretofore admitted the wash-water. In doing this he has opened the port $h$ into the valve $b$, so that there is an inflow of air through the valve $c$, the ports $t\,t$, into the air-chamber A. The atmospheric pressure in connection with the weight of the water contained in the chamber A will cause the water contained in that chamber to flow through the ports $k$, down through the pipe $e$, its continuation $n$, and the port $p$, out into the bottom of the filtering-chamber B, the valve $m$, and the outlet-pipe $g$, thus allowing air to take the place of the water contained in the air-chamber A. A repetition of turning the valve-handle $c'$ to alternately admit the washing-water through the pipe $a$ and the air through the valve $b$ for a few times will thoroughly wash and aerify the filtering material contained in the filter-chamber B.

I prefer to use the check-valve contained in the air-inlet, so as to avoid the ejectment of water, which would be caused by a turning of the valve-handle $c'$, and the consequent sudden release of compressed air contained in the air-chamber A; but this check-valve is not essential to the operation of the apparatus.

The water used in washing may be either filtered water or unfiltered water, as may be desired.

The operation of the device when filtering is as follows: The liquid to be filtered passes into the inlet-pipe $a$, through the inlet-port $s$, out through the ports $t\,t$, into the air-chamber A, through the port $j$, down through the pipe $w$, connecting-pipes $v\,e$, into, down, and through the filtering material contained in the filter B, through the perforated screen $o$, thus through the port $p$, into and up through the pipe $n$, and out through the outlet $g$, the valve-handle $f'$ having been given one-half turn for the purpose.

I am aware that it is not new to pass water containing air through the filtering material of a filter in the operation of washing it; but

What I claim as my invention, and desire to secure by Letters Patent, is—

In a filtering apparatus, the combination of an air-chamber containing the inlet and outlet valves and ports for air and water, substantially as described, with a filter having the inlet and outlet valves and ports for water and air, substantially as described.

JAMES E. WILLIAMSON.

Witnesses:
 JAMES J. COSGROVE,
 J. E. HINDON HYDE.